Jan. 17, 1967    T. M. SCRUGGS    3,298,739
SEAT BELT SAFETY APPARATUS
Filed Dec. 16, 1964    2 Sheets-Sheet 1
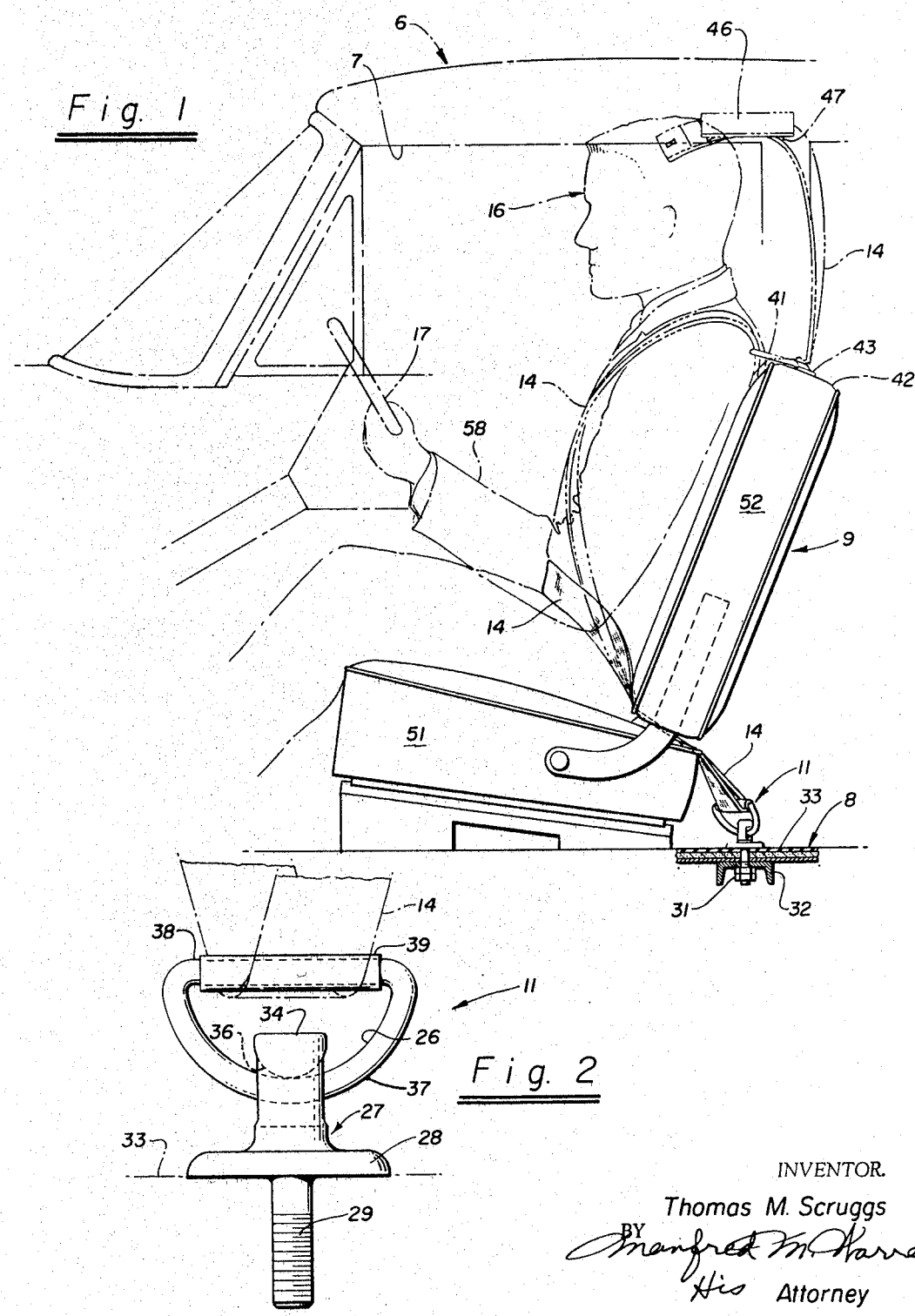
INVENTOR.
Thomas M. Scruggs
BY Manfred M. Warren
His Attorney

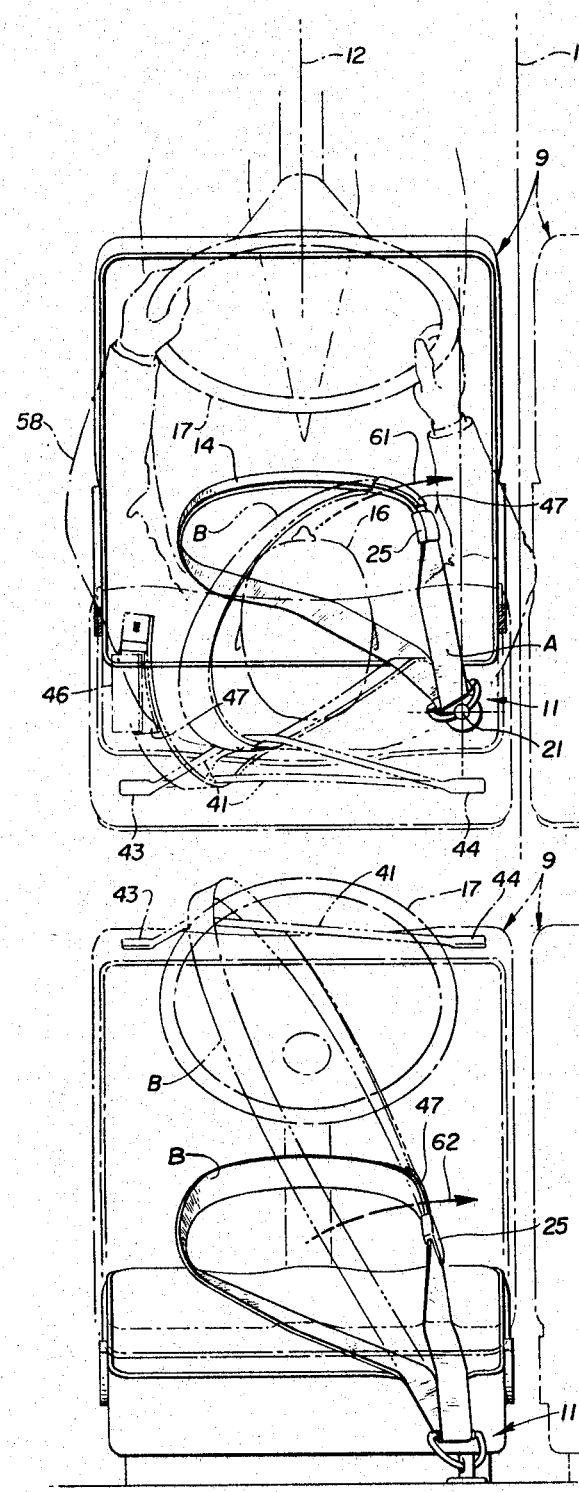

United States Patent Office 3,298,739
Patented Jan. 17, 1967

3,298,739
SEAT BELT SAFETY APPARATUS
Thomas M. Scruggs, 1250 Millbrae Ave., Millbrae, Calif. 94031
Filed Dec. 16, 1964, Ser. No. 418,816
11 Claims. (Cl. 297—389)

The invention relates to new and useful improvements in automobile safety apparatus, particularly to safety seat belts adapted for use in vehicles.

The following statement written by Horace E. Campbell, M.D., formerly Vice Chairman, Committee on Medical Aspects of Automobile Safety, American Medical Association, appeared in the "Consumer Bulletin," September 1964, page 35. "Most people die in crashes because they strike the steering wheel and steering column, or because the steering shaft is driven back into them, than from any other design feature (except inadequate door locks) of the 7,000,000 new cars that consumers bought in 1963."

In order to prevent occupants from being killed or injured due to the two main deficiencies of present day automobiles, namely by being impaled on the steering column or being thrown bodily or partially out an open door, it is an object of the present invention to provide a safety apparatus for an occupant of a vehicle which combines with the dynamic conditions occurring after the moment of a collision impact of the vehicle to move the occupant of the safety apparatus and all parts of his body to a position of greater safety away from behind the steering column and the vehicle door opening while securely holding the occupant in the safety apparatus.

Another object of the present invention is to provide a safety apparatus of the character described which may be adapted for use in substantially all vehicles and which is easily adjustable to accommodate occupants of varying size and weight; affording children as well as adults the same degree of safety.

A further object of the present invention is to provide a safety apparatus of the character described having parts relatively few in number, inexpensive and exceeding safety design standards.

Still another object of the present invention is to provide a safety apparatus of the character described which may be conveniently retained in an accessible position when not in use.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (two sheets):

FIGURE 1 is a side elevation of a seat belt safety apparatus constructed in accordance with the present invention and shown operatively connected to a portion of a vehicle and encircling an occupant. The safety apparatus is also rigged in phantom line as a harness. Still another phantom line shows the apparatus attached to the vehicle when not in use.

FIGURE 2 is a side elevation of a portion of the safety apparatus.

FIGURE 3 is a top plan view of the safety apparatus shown in FIGURE 1.

FIGURE 4 is a rear elevation of the safety apparatus shown in FIGURE 1.

The seat belt safety apparatus of the present invention for a vehicle 6, a body section 8, and an occupant seat 9 disposed above and forwardly of the section consists briefly of: an anchor 11 secured to the body section; a flexible belt 14 pivotally connected to the anchor proximally said body sections and having sections adapted to be extended upwardly therefrom forming a loop encircling an occupant 16 of the seat; said anchor restricting the movement of the belt at said anchor connection in a vertical direction and said belt functioning under conditions of abrupt forward deceleration to narrow in the transverse direction to prevent the occupant from slipping out of the belt.

While the aforesaid construction holds a child in the safety belt as securely as an adult and therefore is a positive advance in the art of seat belts for vehicle passenger, still further steps need to be taken to protect the driver from being impaled on the steering column and to move passengers seated adjacent doors and windows away from these side openings 7.

This added protection is accomplished by locating the anchor 11 interjacent the longitudinal center line 12 of the seat and the longitudinal center line 13 of the vehicle; the apparatus thus restricting the movement of the occupant relative to the seat, and the location of the anchor relative to the seat and vehicle center line functioning to swing the occupant toward the center line of the vehicle away from behind the steering wheel 17 or side openings under conditions of abrupt forward deceleration, and to securely prevent the occupant or his limbs from moving through the side openings under conditions of abrupt transverse acceleration of the vehicle.

Belt 14 of the present invention may be constructed from any of the standard seat belt materials, such as nylon webbing, and may be formed in two separate lengths, each attached to the anchor 11. It is preferable, however, to form belt 14 in one continuous length thus effecting a savings in cost and material as well as contributing to the primary function of safety by eliminating potential sources of weakness such as (fastening, means used to connect the belt to the anchor).

Belt 14 is attached to a body section disposed below and rearwardly of an occupant seat as in some other standard seat belt attachments. Unlike the prior art anchorages, as mentioned above, the belt of the present invention is attached to a section interjacent the longitudinal center line of the seat and the longitudinal center line of the vehicle. There may be one or more anchorages to the vehicle body section so long as the belt and anchorage co-operate to swing the occupant toward the center line of the vehicle under conditions of abrupt forward deceleration, and to securably prevent the occupant from moving through the side openings under conditions of abrupt transverse acceleration. Preferably a single anchorage to the body section accomplishes the foregoing with maximum efficiency and a minimum of materials.

Standard prior art seat belts tend to immobilize the seat occupant in a headon collision and the driver is held in position for impalement on the steering column under severe impact conditions. The present safety apparatus in contrast functions to swing the driver away from the steering column and away from the door openings adjacent his seat. Referring to FIGURE 3, during a head-on collision, the occupant 16 tends to swing about an arc around a pivot point 21 of anchorage 11. It can be seen that the occupant under such conditions would move slightly forwardly and laterally to the right. Since the body moves forwardly, in a headon collision, the full weight of the occupant is not placed on the anchorage at the time of the initial shock. The occupant first moves forwardly and towards the center line of the automobile, then after the initial shock the full weight of the occupant is placed on the anchor 11.

The safety apparatus of the present invention may be used either as a lap belt as shown in full lines in FIGURES 1, 3 and 4 or it may be used as a harness, or sash, as shown in phantom lines in the abovenamed figures. The harness arrangement provides greater restraint on the upper portions of the occupant from moving laterally through the door or window openings than the lap belt. In addition, the harness provides greater restraint upon the upper portions of the body moving forwardly into the steering column.

The use of a single loop of belt attached at substantially a single point anchorage holds the occupant more securely in the safety belt than the present-day two anchorage point safety belts so that there is less likelihood that the occupant will slip out from under the belt under severe collision conditions. Present-day seat belts having spaced apart anchorages, act much like a railing in restraining the seat occupant and provide very little restraint in the transverse direction particularly with seat belt mountings in the newer automobiles in which the anchorages are placed to the side of the occupant rather than to the rear. The safety apparatus of the present invention restrains the occupant in quite a different way under collision conditions. As the occupant moves forwardly in relation to the seat 9, the loop formed by the belt narrows in the transverse direction. Thus the occupant 16 is held more closely under crash conditions and it is practically impossible for the occupant to slip out of the seat belt 14.

In the harness position, the flexible belt encircles the occupant by extending upwardly from the anchor, passing over the shoulder which is located adjacent the side opening and then passing downwardly and transversely across the torso of the occupant and then rearwardly to the anchor. The occupant is held more closely in either the seat belt or the harness arrangement of the present invention, but the harness arrangement with the offset anchorage point coacts in a manner entirely different from harnesses having two spaced anchorage points. In the prior art harnesses, the force of the belt in a headon collision is directly against the chest. In the present safety apparatus, however, the forces experienced are decidedly different in that the force of the belt is mainly brought to bear against the shoulder and the chest.

In the present invention, anchor 11 is formed with an open portion 26 through which flexible belt 14 is threadably inserted. Where a single length of belt is used, the belt may thus be easily moved through opening 26. This construction provides for easy adjustment by the occupant. For example, if the ends of the belt are joined by a relatively heavy metal buckle, the user may slide the entire belt in either direction so that the belt buckle is placed to the side of the occupant and the weight of the buckle does not rest upon the occupant. A still more important feature of the present safety apparatus, however, is the fact that the belt may be converted from either a lap belt or a harness with relative ease. In the prior art spaced double anchor type of belt, the strap adjacent the door normally carries the metal hook portion and cannot be lengthened except at the anchorage. In standard anchorages, it is so difficult to lengthen the belt at the anchorage that a passenger would normally use the belt in the arrangement previously set up rather than change it. In contrast, the apparatus of the present invention may be changed easily from the lap to the harness position and vice-versa by merely adjusting the length of the belt at the buckle and the entire loop may be threaded through the anchorage until the buckle is in a convenient location at the side of the occupant.

The coupling means 25 releasably joining the ends of belt 14 of the present invention may be a standard metal-to-metal type buckle or a VELVET-LOCK coupling which uses a material such as VELCRO and is more fully described in my patent application, Serial No. 319,357, filed October 28, 1963. The VELVET-LOCK coupling is particularly adapted for use with the single tie-down anchor due to the fact that the loop in a single anchor presents more surface in curved sheer and the loop has a smaller radii; the VELCRO material being stronger in curved sheer and thus a more secure coupling is obtained.

The anchor 11 may be of any standard form which may be securably anchored to the vehicle. As shown in FIGURES 1 and 2 anchor 11 here comprises a base 27 having a laterally extending flange 28 and a protruding threaded stud 29 upon which a threaded nut 31 is placed to bear against a washer 32 in contact with the floor or frame area 33. The base 27 carries an upstanding portion 34 having an opening 36 therethrough. A member 37 is inserted through opening 36 and may consist of a simple D ring having an elongated transverse portion 38. A sleeve member 39 is rotatably mounted on portion 38. Belt 14 may move freely through opening 26 about sleeve 39 thus permitting the occupant to twist in the seat 9 to a limited degree and yet belt 14 will remain substantially stationary in relation to the occupant's body.

Permitting the belt 14 to move freely through the anchor 11 considerably alleviates the problem of the belt severing at the point of connection to the anchor due to binding or twisting of the belt on the metal portions. Provision of the sleeve 39 having a curved surface upon which the belt 14 rides adds considerably to the strength of the connection between the belt and metal anchor.

Opening 36 in upstanding portion 34 of the anchor 11 is preferably elongated in the vertical direction and has a greater width than the diameter of member 37 so that the member 37 may pivot in a substantially universal movement so that the axis of sleeve 39 is substantially perpendicular to the direction of force applied by belt 14. The universal movement of the anchor substantially prevents failure of the belt at the anchor connection.

One of the major problems in reducing injury due to automobile accidents is how to motivate people to use seat belts once they have been mounted in the vehicle. It is estimated by the National Safety Council that approximately 5,000 lives per year would be saved if people would fasten the safety belts already installed in their automobiles. Part of the problem is due to the fact that it is apparently too difficult to find the ends of the safety belts which are somehow never in the same position after each use, or they are so cleverly retracted into containers or into the back corners of the seats that passengers do not realize that the vehicle is equipped with safety belts. A major feature of the present invention is the provision of catch means mounted adjacent an end of the belt 14 and hook means adapted for mounting on an interior side of the vehicle for engaging the catch means for securing the belt end in a fixed conveniently accessible second position when the belt ends are uncoupled. As shown in FIGURE 1 the hook means is located on the side of the vehicle preferably at a point above the shoulder height of the occupant so that the belt is readily visible upon taking a seat and is conveniently available for coupling.

When the belt 14 is used as a harness, a flexible chord 41 attached to the top portion 42 of seat 9 as by fasteners 43 and 44 and connected to belt 14 assists in holding the belt in an easily accessible position when the belt is not in use. Chord 41 may be a shock cord consisting of strands of rubber held in a sheath of nylon and commonly known as a BUNGEE CHORD. Such a chord permits belt 14 to move forwardly and snugly against the occupant 16 when in use. The belt is preferably placed behind chord 41 as shown in FIGURES 1 and 4 and permitted to slide transversely of the seat or the belt may be actually attached to the chord.

Hook means 46 mounted on an interior side of the vehicle and catch means 47 mounted on the end of the belt 14 may be any standard hook and eye, but in order to provide a hook and catch means of maximum safety, convenience and acceptability to passengers, I have found that the hook means 46 is best provided by affixing a strip of VELCRO material to either the roof column or the roof area immediately above the side windows adjacent the occupant. VELCRO material is fully shown and described in U.S. Patent No. 3,009,235. Such VELCRO material may be conveniently affixed to the automobile by adhesive, stitching or tacking. Catch means 47 is provided by using VELCRO material affixed adjacent the end of belt 14 by adhesives, stitching or tacking. The catch means could even be woven into a sleeve and held to the belt by friction. The use of the sleeve would enable the catch means to be selectively placed at different positions along the belt 14 as conditions require. The catch means 47 is preferably made of the filament loops described in the Patent No. 3,009,235 and the hook means 46 constructed of the filament hooks. Use of the filament loops on the belt portion prevents snagging of the users' clothes. The use of VELCRO material as the hook and catch means is extremely convenient as the user, in a short time, is able to make the connection and release without even looking at the hook and catch means.

One of the primary advantages of using the VELCRO material is the fact that it is lightweight; adds practically no weight to the end of the belt, and from a safety viewpoint is unsurpassed. The use of VELCRO does not introduce any protruding metal hooks or other obvious safety hazards such as are present in today's automobiles which place a protruding hook at the level of and within a few inches of the occupant's head. Such hooks present a more serious safety hazard than the belts purport to alleviate.

Still another advantage of using VELCRO as a hook and catch means is provided by the fact that the hook and catch means do not weaken the belt in any way since the VELCRO material may be adhered directly to the belt without piercing the belt.

The construction of the anchor of the present invention makes it possible to have a relatively short length A adapted to extend upwardly from the anchor between the rearward portion of the seat cushion 51 and the lower edge of the associated back cushion 52, and a relatively long length B adapted to extend upwardly from the anchor between the cushion edges; diagonally upwardly across the back cushion away from the vehicle center line and downwardly across the occupant forming a single loop pivotally connected through the anchor in a first belt position as shown in FIGURES 3 and 4 in phantom line. Such a long belt length adjacent the door opening would ordinarily be very objectionable as it would be difficult to keep the end portions within the car without the use of a take-up reel which would add greatly to the expense of the safety apparatus without a corresponding contribution to increased safety. The use of a long length B permits the coupling means 25, which is ordinarily a relatively heavy metal buckle, to be placed at the side of the occupant where its weight may be borne partially by the seat cushion 51 rather than against the tender part of the occupant's abdomen. As a safety feature, the placing of the buckle at the side of the occupant removes one more potential hazard as the metal buckle cannot be driven into the occupant by striking the steering column as is ordinarily the case where the buckle rests upon the occupant's abdomen or chest.

In operation, the occupant is seated as in FIGURES 1 and 3 with belt 14 secured about his person in either a lap belt or a harness position. If the vehicle is struck from the front, the occupant swings toward the center line of the automobile about the pivot point 21 away from behind the steering wheel 17 and the door opening 7 as shown by arrows 61 and 62 in FIGURES 3 and 4 respectively.

If the vehicle is struck from the left as shown in FIGURE 3, the occupant tends to move to the left towards the door opening 7. Since the anchor 11 is secured near the center line of the automobile the loop of the belt 14 securely holds the occupant from moving laterally.

If the vehicle is struck from the right as shown in FIGURE 3, the occupant would move to the right with little restraint until the occupant passed the center line of the automobile. The seat belt 14 would, however, restrain the occupant from moving through the door opening on the right side of the vehicle.

While the above description has been primarily directed to automobiles, it is to be understood that the present invention applies to all moving vehicles such as airplanes, boats, trains, etc.

In employing the hook and catch means 46 and 47, the operation is as follows: Occupant 16 takes his seat, reaches upwardly with his left hand 58 as shown in FIGURES 1 and 3. Flexible chord 41 automatically holds a portion of belt 14 in the correct position so that the belt automatically falls over the left shoulder of the occupant as the end of the belt is moved toward the buckle 25 at the right side of the occupant. Since buckle 25 is on a short length A of belt 14, the buckle is easily found. When the occupant wishes to remove the safety apparatus, the end of the belt is uncoupled from buckle 25 with the left hand 58, and the operator merely presses the end of the belt to which a VELCRO material is affixed to the hook means 46 located on the side of the vehicle. Thus in a single movement, the safety apparatus is uncoupled from the occupant and attached to the side of the vehicle where it can be easily found for the next use.

I claim:
1. A seat belt safety apparatus for a vehicle having side openings, a floor body section, and an occupant seat having back and bottom portions disposed above and forwardly of said section comprising:
 an anchor secured to said floor section interjacent the longitudinal center line of said seat and the longitudinal center line of said vehicle;
 a single loop flexible belt having an end connected to said anchor forming a single pivot point and adapted to be extended upwardly between said back and bottom seat portions for encircling an occupant of said seat; and
 said apparatus restricting the movement of said occupant relative to said seat and the location of said anchor relative to said seat and vehicle center line functioning to swing said occupant toward the center line of said vehicle under conditions of abrupt forward deceleration, and to securely prevent said occupant from moving through the side openings under conditions of abrupt transverse acceleration of said vehicle.

2. A seat belt safety apparatus for a vehicle having side openings, a floor body section, and an occupant seat having a back and bottom portion disposed above and forwardly of said section, and an occupant seat disposed above and forwardly of said section comprising:
 an anchor secured to said section interjacent the longitudinal center line of said seat and the longitudinal center line of said vehicle;
 a flexible belt connected to said anchor and having a length adapted to encircle an occupant by extending upwardly from said anchor between said seat back bottom portions and passing over the shoulder of the occupant of said seat located adjacent said side opening and downwardly and transversely across the torso of the occupant and then rearwardly and downwardly between said seat portion to said anchor; and
 said apparatus restricting the movement of said occupant relative to said seat and the location of said anchor relative to said seat and vehicle center line functioning to swing said occupant toward the center line of said vehicle under conditions of abrupt forward deceleration, and to securely prevent said occupant from moving through the side openings under conditions of abrupt transverse acceleration of said vehicle.

3. A seat belt safety apparatus for a vehicle having side openings, a floor body section and an occupant seat having a back and bottom portion disposed above and forwardly of said section comprising:
   an anchor adapted for connection to said section interjacent the longitudinal center line of said seat and the longitudinal center line of said vehicle, and having a portion formed with an opening therethrough;
   a flexible belt having a portion threadably inserted through the opening in said portion and adapted to be extended upwardly from said anchor between said seat back and bottom portions for encircling an occupant of said seat and forming a loop pivotally and slidably connected to said anchor;
   coupling means releasably joining the ends of said belt; and
   said apparatus restricting the movement of said occupant relative to said seat and the location of said anchor relative to said seat and vehicle center line functioning to swing said occupant toward the center line of said vehicle under conditions of abrupt forward deceleration, and to securely prevent said occupant from moving through the side openings under conditions of abrupt transverse acceleration of said vehicle.

4. A seat belt safely apparatus for a vehicle having side openings, a floor body section and an occupant seat having a back and bottom portion disposed above and forwardly of said section comprising:
   a single anchor adapted for connection to said section interjacent the longitudinal center line of said seat and the longitudinal center line of said vehicle, and being formed with an elongated transverse member spaced from the floor of said vehicle;
   a sleeve member rotatably mounted on said transverse member;
   a flexible belt mounted on said sleeve for free rolling movement thereon and adapted to be extended upwardly between said back and bottom seat portions and encircling an occupant of said seat forming a single loop pivotally connected to said anchor sleeve;
   coupling means releasably joining the ends of said belt; and
   said apparatus restricting the movement of said occupant relative to said seat and the location of said anchor relative to said seat and vehicle center line functioning to swing said occupant toward the center line of said vehicle under conditions of abrupt forward deceleration and to securably prevent said occupant from moving through said side openings under conditions of transverse acceleration of said vehicle.

5. A seat belt safety apparatus for a vehicle having side openings, a floor body section and an occupant seat having back and bottom seat portions disposed above and forwardly of said section comprising:
   a single anchor adapted for connection to said section interjacent the longitudinal center line of said seat and the longitudinal center line of said vehicle;
   a transverse member pivotally connected to said anchor providing substantially universal movement thereon;
   a sleeve member rotatably mounted on said transverse member;
   a flexible belt mounted on said sleeve for rolling movement thereon and adapted to be extended upwardly therefrom between said back and bottom seat portions for encircling an occupant of a seat forming a single loop pivotally connected to said anchor sleeve;
   coupling means releasably joining the ends of said belt; and
   said apparatus restricting the movement of said occupant relative to said seat and the location of said anchor relative to said seat and vehicle center line functioning to swing said occupant toward said center line of said vehicle under conditions of abrupt forward deceleration and to securably prevent said occupant from moving through the side openings under conditions of abrupt transverse acceleration of said vehicle.

6. A seat belt safety apparatus for a vehicle having side openings, a body section, and an occupant seat having back and bottom seat portions disposed above and forwardly of said section comprising:
   an anchor secured to said section interjacent the longitudinal center line of said seat and the longitudinal center line of said vehicle;
   a flexible belt connected to said anchor and adapted to be extended upwardly therefrom between said back and bottom seat portions in a first position for encircling an occupant of said seat;
   coupling means releasably joining the ends of said belt;
   catch means mounted adjacent an end of said belt on said flexible portion of said belt;
   hook means adapted for mounting on an interior side of said vehicle above said seat back for engaging said catch means for securing said belt end in a fixed conveniently accessible second position when said belt ends are uncoupled; and
   said apparatus restricting the movement of said occupant relative to said seat and the location of said anchor relative to said seat and vehicle center line functioning to swing said occupant toward the center line of said vehicle under conditions of abrupt forward deceleration, and to securably prevent said occupant from moving through the side openings under conditions of abrupt transverse acceleration of said vehicle.

7. A seat belt safety apparatus for a vehicle having side openings, a floor body section and an occupant seat having back and bottom portions disposed above and forwardly of said section comprising:
   a single anchor adapted for connection to said floor section interjacent the longitudinal center line of said seat and the longitudinal center line of said vehicle, and having a portion formed with an opening therethrough;
   a flexible belt having a portion threadably inserted through said anchor opening and adapted to be extended upwardly therefrom between said seat portions in a first position for encircling an occupant of a seat and forming a single loop pivotally connected to said anchor;
   coupling means releasably joining the ends of said belt;
   catch means mounted adjacent an end of said belt;
   hook means adapted for mounting on an interior side of said vehicle above said seat back portion for engaging said catch means for securing said belt end in a fixed conveniently accessible second position when said belt ends are uncoupled; and
   said apparatus restricting the movement of said occupant relative to said seat and the location of said anchor relative to said seat and vehicle center line functioning to swing said occupant toward the center line of said vehicle under conditions of abrupt forward deceleration and to securably prevent said occupant from moving through the side openings under conditions of abrupt transverse acceleration of said vehicle.

8. A seat belt safety apparatus for a vehicle having side openings, a floor body section and an occupant seat having seat and back cushions disposed above and forwardly of said section comprising:
- a single anchor having an opening therethrough adapted for connection to said floor section interjacent the longitudinal center line of said seat and the longitudinal center line of said vehicle;
- a flexible belt having a portion threadably inserted through the opening in said anchor adapted to be extended upwardly from said anchor between the rearward edge of said seat cushion and the lower edge of said associated back cushion in a first position for encircling an occupant of a seat and forming a single loop pivotally connected to said anchor;
- coupling means releasably joining the ends of said belt;
- catch means mounted adjacent an end of said belt;
- hook means adapted for mounting on an interior side of said vehicle above said back cushion for engaging said catch means for securing said belt end in a fixed conveniently accessible second position when said belt ends are uncoupled;
- flexible means adapted for connection to the upper back portion of said back cushion and mounted for engaging a portion of said belt and being movable therewith to said first position and biasing said belt to said second position; and
- said apparatus restricting the movement of said occupant relative to said seat and the location of said anchor relative to said seat and vehicle center line functioning to swing said occupant toward the center line of said vehicle under conditions of abrupt forward deceleration and to securably prevent said occupant from moving through the side openings under conditions of abrupt transverse acceleration of said vehicle.

9. A seat belt safety apparatus for a vehicle having side openings, a floor body section and an occupant seat having seat and back cushions disposed above and forwardly of said section comprising:
- a single anchor having an opening adapted for connection to said floor section interjacent the longitudinal center line of said seat and the longitudinal center line of said vehicle;
- a flexible belt having a portion threadably inserted through said anchor opening adapted to be extended upwardly from said anchor between the rearward edge of the seat cushion and the lower edge of the associated back cushion in a first position for encircling an occupant of a seat and forming a single loop pivotally connected to said anchor;
- coupling means releasably joining the end of said belt;
- catch means having a plurality of loop filaments mounted adjacent an end of said belt;
- hook means having a plurality of hook shaped filaments adapted for mounting on an interior side of said vehicle above said back seat cushion for releasably engaging said catch means for securing said belt end in a fixed conveniently accessible second position when said belt ends are uncoupled;
- flexible means adapted for connection to the upper back portion of said back cushion and mounted for engaging a portion of said belt and movable therewith to said first position and biasing said belt to said second position; and
- said apparatus restricting the movement of said occupant relative to said seat and the location of said anchor relative to said seat and vehicle center line functioning to swing said occupant toward the center line of said vehicle under conditions of abrupt forward deceleration and to securably prevent said occupant from moving through the side openings under conditions of abrupt transverse acceleration of said vehicle.

10. A seat belt safety apparatus for a vehicle having side openings, a floor body section and an occupant seat having seat and back cushions disposed above and forwardly of said section comprising:
- a single anchor adapted for connection to said section interjacent the longitudinal center line of said seat and the longitudinal center line of said vehicle;
- a transverse member pivotally connected to said anchor providing substantially universal movement thereon;
- a sleeve member rotatably mounted on said transverse member;
- a flexible belt mounted on said sleeve for rolling movement thereon and having a relatively short length adapted to extend upwardly from said anchor between the rearward edge of the seat cushion and the lower edge of the associated back cushion of said seat, and a relatively long length adapted to extend upwardly from said anchor between said cushion edges and diagonally upwardly across said back cushion away from said vehicle center line and downwardly across said occupant and forming a single loop pivotally connected to said anchor in a first belt position;
- coupling means releasably joining the end of said belt;
- catch means having a plurality of loop filaments mounted adjacent an end of said belt;
- hook means having a plurality of hook shaped filaments adapted for mounting on an interior side of said vehicle above said back seat cushion for releasably engaging said catch means for securing said belt end in a fixed conveniently accessible second position when said belt ends are uncoupled;
- flexible means adapted for connection to the upper back portion of said cushion and connected to a portion of said belt and movable therewith to said first position and biasing said belt to said second position; and
- said apparatus releasably restricting the movement of said occupant relative to said seat and the location of said anchor relative to said seat and vehicle center line functioning to swing said occupant toward the center line of said vehicle under conditions of abrupt forward deceleration and to securably prevent said occupant from moving through the side openings under conditions of abrupt transverse acceleration of said vehicle.

11. A seat belt safety apparatus for a vehicle having a steering column, a driver's seat in alignment with and behind said steering column, a side opening adjacent said seat and a floor section comprising:
- a single loop flexible belt having a length to encircle an occupant of said seat; and
- means connected to said belt at a single point and to said vehicle floor section so as to swing an occupant of said seat away from said side opening and from behind said steering column in the event of a collision.

References Cited by the Examiner

UNITED STATES PATENTS

| | | | |
|---|---|---|---|
| 2,365,626 | 12/1944 | Carlisle | 280—150 X |
| 2,705,044 | 3/1955 | Nolen | 280—150 X |
| 2,717,437 | 9/1955 | De Mestral | 161—65 |
| 2,823,046 | 2/1958 | Banta | 297—385 |
| 2,878,981 | 3/1959 | Guido | 297—385 X |
| 3,076,679 | 2/1963 | Lorber | 297—385 |

FOREIGN PATENTS

| | | |
|---|---|---|
| 817,590 | 8/1959 | Great Britain. |
| 97,633 | 1/1961 | Norway. |

FRANK B. SHERRY, *Primary Examiner.*

JAMES T. McCALL, *Assistant Examiner.*